(12) United States Patent
Feng

(10) Patent No.: US 12,124,296 B2
(45) Date of Patent: Oct. 22, 2024

(54) SUPPORT STRUCTURE AND ELECTRONIC DEVICE

(71) Applicant: VIVO MOBILE COMMUNICATION CO., LTD., Guangdong (CN)

(72) Inventor: Xiang Feng, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 0 days.

(21) Appl. No.: 18/485,491

(22) Filed: Oct. 12, 2023

(65) Prior Publication Data

US 2024/0036606 A1 Feb. 1, 2024

Related U.S. Application Data

(63) Continuation of application No. PCT/CN2022/089018, filed on Apr. 25, 2022.

(30) Foreign Application Priority Data

Apr. 27, 2021 (CN) .......................... 202110462579.3

(51) Int. Cl.
*G06F 1/16* (2006.01)
*G09F 9/30* (2006.01)

(52) U.S. Cl.
CPC .......... *G06F 1/1641* (2013.01); *G06F 1/1624* (2013.01); *G06F 1/1652* (2013.01); *G09F 9/301* (2013.01)

(58) Field of Classification Search
None
See application file for complete search history.

(56) References Cited

U.S. PATENT DOCUMENTS

| 2018/0232011 | A1* | 8/2018 | Jiang ....................... G09F 9/301 |
| 2020/0137907 | A1  | 4/2020 | Kang et al. |
| 2022/0011821 | A1* | 1/2022 | Han ......................... G06F 1/1624 |
| 2022/0254281 | A1* | 8/2022 | Zhang .................... G06F 1/1601 |

(Continued)

FOREIGN PATENT DOCUMENTS

| CN | 106652798 A | 5/2017 |
| CN | 106884867 A | 6/2017 |

(Continued)

*Primary Examiner* — Richard H Kim
(74) *Attorney, Agent, or Firm* — Price Heneveld LLP

(57) ABSTRACT

A support structure is provided. The support structure includes a first support plate (1), a second support plate (2), a third support plate (3), and a transmission mechanism (4). The first support plate (1) and the second support plate (2) are arranged in parallel. The transmission mechanism (4) is disposed on one side of the first support plate (1) and the second support plate (2) away from a display. The third support plate (3) is connected to the transmission mechanism (4), and the transmission mechanism (4) is rotatably connected to the first support plate (1) and the second support plate (2). An electronic device is provided, which includes one or more such support structures. This configuration can solve the problem of the support area provided by the support structure of the electronic device having certain limitations and thus meets the support requirements for displays of different active screen sizes.

15 Claims, 7 Drawing Sheets

(56) References Cited

U.S. PATENT DOCUMENTS

| | | | |
|---|---|---|---|
| 2023/0088917 A1* | 3/2023 | Zhong | G06F 1/1652 345/173 |
| 2023/0097200 A1 | 3/2023 | Feng | |
| 2023/0337380 A1 | 10/2023 | Ye | |

FOREIGN PATENT DOCUMENTS

| | | |
|---|---|---|
| CN | 110010007 A | 7/2019 |
| CN | 111510537 A | 8/2020 |
| CN | 111664337 A | 9/2020 |
| CN | 111683166 A | 9/2020 |
| CN | 112153181 A | 12/2020 |
| CN | 112533404 A | 3/2021 |
| CN | 113124292 A | 7/2021 |

* cited by examiner

SUPPORT STRUCTURE AND ELECTRONIC DEVICE

CROSS-REFERENCE TO RELATED APPLICATIONS

This application is a continuation application of PCT International Application No. PCT/CN2022/089018 filed on Apr. 25, 2022, which claims priority to Chinese Patent Application No. 202110462579.3, filed to the China National Intellectual Property Administration on Apr. 27, 2021 and entitled "SUPPORT STRUCTURE AND ELECTRONIC DEVICE", which are incorporated herein by reference in their entireties.

TECHNICAL FIELD

This application pertains to the field of communication technologies, and specifically, relates to a support structure and an electronic device.

BACKGROUND

With the continuous development of electronics, the performance of electronic devices has become increasingly powerful. In order to provide users with a better visual experience, the active screen size of the display of electronic devices is gradually expanding.

In the related art, in order to expand the active screen size of the display, designs such as narrow bezel, full screen, and foldable screen are commonly used to increase the screen-to-body ratio.

However, the above-mentioned method is used to determine the size of a support structure used for supporting the display but cannot adapt to the changing size of the display itself. This results in the support area provided by the support structure having certain limitations and therefore cannot meet the support requirements for displays of different active screen sizes.

SUMMARY

According to a first aspect, an embodiment of this application provides a support structure used for supporting a display. The support structure includes a first support plate, a second support plate, a third support plate, and a transmission mechanism;
  the first support plate and the second support plate are arranged in parallel, the transmission mechanism is disposed on one side of the first support plate and the second support plate away from the display, the third support plate is connected to the transmission mechanism, and the transmission mechanism is rotatably connected to the first support plate and the second support plate;
  when the first support plate and the second support plate move towards each other, the first support plate and the second support plate drive the third support plate through the transmission mechanism to move in a direction away from the display; and
  when the first support plate and the second support plate move away from each other, the first support plate and the second support plate drive the third support plate through the transmission mechanism to move in a direction close to the display, so that a support surface of the third support plate and a support surface of the first support plate are in the same plane.

The transmission mechanism includes a first rocker arm, a second rocker arm, and a driving gear;
  a first end of the first rocker arm is hinged to a side wall of the first support plate, a first end of the second rocker arm is hinged to a side wall of the second support plate, a second end of the first rocker arm and a second end of the second rocker arm are separately hinged to the third support plate, and the second end of the first rocker arm and the second end of the second rocker arm are connected by the driving gear; and
  a length of the first rocker arm is equal to a length of the second rocker arm, and the length of the first rocker arm is greater than a length of the third support plate in a first direction, where the first direction is a direction perpendicular to the support surface of the third support plate.

Optionally, the driving gear includes a first gear and a second gear; wherein
  both the second end of the first rocker arm and the second end of the second rocker arm have an arc-shaped tooth surface, the second end of the first rocker arm engages with the first gear, the first gear engages with the second gear, and the second end of the second rocker arm engages with the second gear.

Optionally, a limiting slot is provided on a side wall of the third support plate, the second end of the first rocker arm, the second end of the second rocker arm, and the driving gear are all installed in the limiting slot, both a slot wall of the limiting slot close to the first rocker arm and a slot wall of the limiting slot close to the second rocker arm have an arc-shaped slot wall, and curved surfaces of the arc-shaped slot walls bend away from the first rocker arm, where the side wall of the third support plate is a surface perpendicular to the support surface of the third support plate.

Optionally, multiple limiting protrusions are provided on an end of the first support plate close to the second support plate, two ends of the third support plate, and an end of the second support plate close to the first support plate;
  when the first support plate and the second support plate move towards each other, the limiting protrusions provided on the end of the first support plate are caught between two of the limiting protrusions provided on the end of the second support plate; and
  when the first support plate and the second support plate move away from each other, the limiting protrusions provided on the end of the first support plate are caught between two of the limiting protrusions provided on one end of the third support plate, and the limiting protrusions provided on the end of the second support plate are caught between two of the limiting protrusions provided on the other end of the third support plate.

Optionally, when the first support plate and the second support plate move away from each other, an installation groove is formed between an end of the first support plate close to the third support plate and an end of the second support plate close to the third support plate, the third support plate is located in the installation groove, and a size of an opening of the installation groove is smaller than a size of the groove bottom, where the opening of the installation groove and the support surface of the first support plate are in the same plane.

Optionally, when the first support plate and the second support plate move towards each other, the limiting protrusion provided on the end of the first support plate is in clearance fit with two of the limiting protrusions provided on the end of the second support plate.

Optionally, the third support plate includes a support portion and a limiting portion; where the limiting portion is located on one side of the support portion and protrudes from the support portion to form a limiting boss, and when the first support plate and the second support plate move away from each other, an end of the first support plate overlaps with the limiting boss.

According to a second aspect, an embodiment of this application provides an electronic device, where the electronic device includes a winding assembly, a housing, a display, and the support structure according to the first aspect; where the winding assembly is disposed in an inner cavity of the housing, and the display is wound on the winding assembly; and when the first support plate and the second support plate move towards each other, the winding assembly rotates along a first rotation direction, causing one end of the display to retract into the inner cavity of the housing, where the display covers the support surface of the first support plate and the support surface of the second support plate; and when the first support plate and the second support plate move away from each other, the winding assembly rotates along a second rotation direction, causing one end of the display to extend out of the inner cavity of the housing, where the display covers the support surfaces of the first support plate, the second support plate, and the third support plate, and the first rotation direction and the second rotation direction are opposite rotation directions.

Optionally, the electronic device includes one or more such support structures.

BRIEF DESCRIPTION OF DRAWINGS

To describe the technical solutions in the embodiments of this application or in the prior art more clearly, the following briefly describes the accompanying drawings required for describing the embodiments or the prior art. Apparently, the accompanying drawings in the following description show merely some of the embodiments of this application, and persons of ordinary skill in the art may still derive other drawings from these accompanying drawings without creative efforts.

REFERENCE SIGNS

1: first support plate; 2: second support plate; 3: third support plate; 4: transmission mechanism; 31: support portion; 32: limiting portion; 33: limiting slot; 41: first rocker arm; 42: second rocker arm; 43: driving gear; 101: mounting groove; 431: first gear; 432: second gear.

DETAILED DESCRIPTION OF EMBODIMENTS

The following clearly describes the technical solutions in the embodiments of this application with reference to the accompanying drawings in the embodiments of this application. Apparently, the described embodiments are only some rather than all of the embodiments of this application. All other embodiments obtained by persons of ordinary skill in the art based on the embodiments of this application shall fall within the protection scope of this application.

The terms "first", "second", and the like in this specification and claims of this application are used to distinguish between similar objects rather than to describe a specific order or sequence. It should be understood that data used in this way is used interchangeably in appropriate circumstances such that the embodiments of this application can be implemented in other orders than the order illustrated or described herein. In addition, "first" and "second" are usually used to distinguish objects of a same type, and do not restrict a quantity of objects. For example, there may be one or a plurality of first objects. In addition, "and/or" in the specification and claims represents at least one of connected objects, and the character "/" generally indicates that the contextually associated objects have an "or" relationship.

Figure 1:
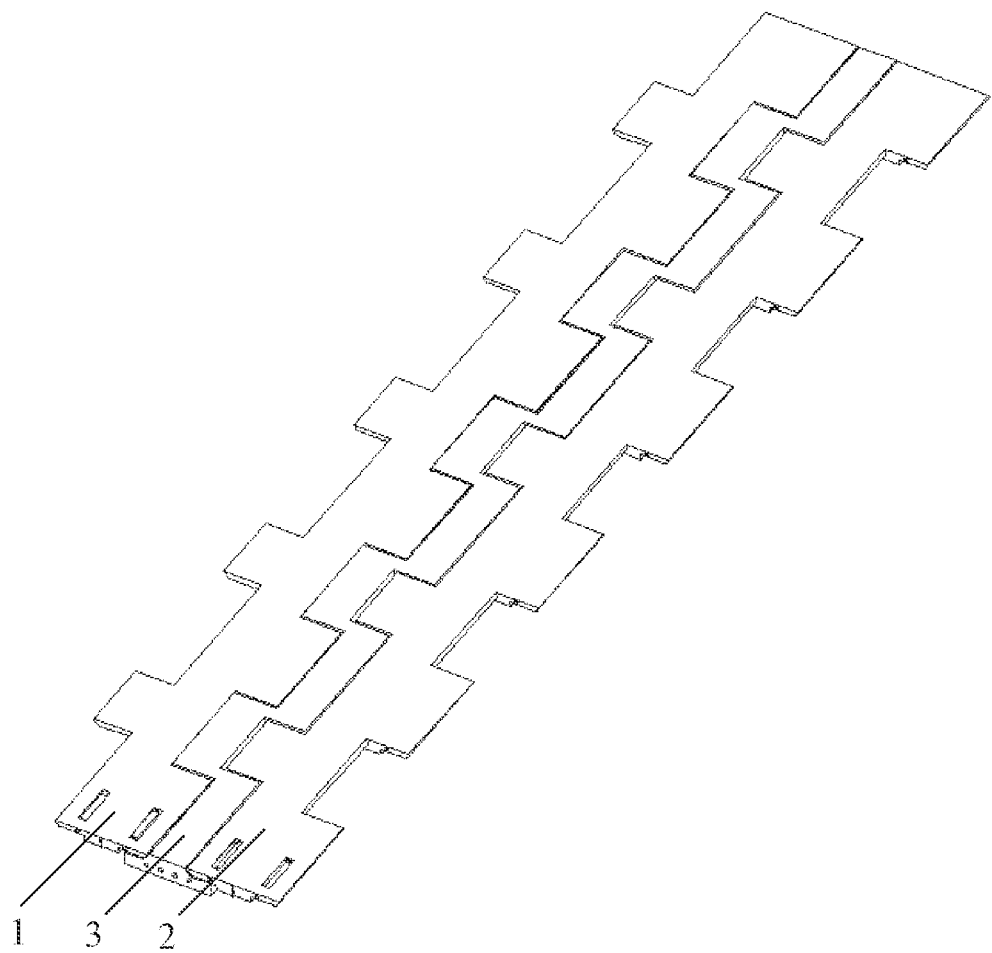
FIG. 1 is a schematic structural diagram of a support structure according to an embodiment of this application.

The following describes the support structure according to the embodiments of this application in detail with reference to accompanying drawings. FIG. 1 is a schematic structural diagram of a support structure according to an embodiment of this application. As shown in FIG. 1, the support structure includes a first support plate 1, a second support plate 2, a third support plate 3, and a transmission mechanism 4. The first support plate 1 and the second support plate 2 are arranged in parallel. The transmission mechanism 4 is disposed on one side of the first support plate 1 and the second support plate 2 away from the display. The third support plate 3 is connected to the transmission mechanism 4, and the transmission mechanism 4 is rotatably connected to the first support plate 1 and the second support plate 2. When the first support plate 1 and the second support plate 2 move towards each other, the first support plate 1 and the second support plate 2 drive the third support plate 3 through the transmission mechanism 4 to move in a direction away from the display. When the first support plate 1 and the second support plate 2 move away from each other, the first support plate 1 and the second support plate 2 drive the third support plate 3 through the transmission mechanism 4 to move in a direction close to the display, so that a support surface of the third support plate 3 and a support surface of the first support plate 1 are in the same plane.

The first support plate 1, the second support plate 2, and the third support plate 3 are basic structures providing support for the display. The first support plate 1, the second support plate 2, and the third support plate 3 all have a support surface for supporting the display. In order to reduce the friction between the support surfaces of the first support plate 1, the second support plate 2, and the third support plate 3 and the display, surface roughness of the support surfaces of the first support plate 1, the second support plate 2, and the third support plate 3 should be controlled within a certain value. For example, surface roughness of the support surfaces of the first support plate 1, the second support plate 2, and the third support plate 3 is less than or equal to 6.3 μm, which is conducive to reducing damage to the display when the first support plate 1 and the second support plate 2 slide. The first support plate 1, the second support plate 2, and the third support plate 3 can be made of any one of materials such as aluminum alloy, stainless steel, steel-aluminum composite, and titanium alloy. The processing technologies and manufacturing requirements of the first support plate 1, the second support plate 2, and the third support plate 3 are determined depending on actual application, and the materials of the first support plate 1, the second support plate 2, and the third support plate 3 are not limited in the embodiments of this application. For example, if it is necessary to reduce the overall weight of the first support plate 1, second support plate 2, and third support plate 3, the first support plate 1, the second support plate 2, and the third support plate 3 may be made of aluminum alloy. If it is necessary to reduce the overall manufacturing cost of the first support plate 1, second support plate 2, and third support plate 3, the first support plate 1, the second support plate 2, and the third support plate 3 may be made of titanium alloy. If it is necessary to improve the overall fatigue strength of the first support plate 1, second support plate 2, and third support plate 3, the first support plate 1, the second support plate 2, and the third support plate 3 may be made of titanium alloy.

In addition, the first support plate 1, the second support plate 2, and the third support plate 3 are all elongated plates. During installation, side walls of the first support plate 1 and the second support plate 2 are connected to a side wall of the third support plate 3 through the transmission mechanism 4, to be specific, the movement of the first support plate 1 and the second support plate 2 drives the transmission mechanism 4 to move, and in turn drives the third support plate 3 to move, thereby expanding and contracting the overall support surface of the support structure.

The first support plate 1 and the second support plate 2 are arranged in parallel, and the first support plate 1 and the second support plate 2 can slide along a direction away from or close to each other. In one possible implementation, rails can be provided along the support surface of the first support plate 1 and a sliding direction of the second support plate 2, sliders are provided on non-support surfaces of the first support plate 1 and the second support plate 2, and the sliders slide on the rails, so that the first support plate 1 and the second support plate 2 slide along the direction away from or close to each other. In another possible implementation, motorized screw modules can be provided on the non-support surfaces of the first support plate 1 and the second support plate 2. During assembly, nut seats are fixed on the non-support surfaces of the first support plate 1 and the second support plate 2. One end of a ball screw is fitted connected to a drive shaft of a drive motor through a coupler, so that the ball screw and the drive shaft rotate coaxially. The other end of the ball screw is connected to the nut seat. The nut seat includes internal threads, and the internal threads are fitted connected to the external threads of the ball screw. In this way, when the drive shaft of the drive motor rotates, it drives the ball screw to rotate, causing the nut seat to move along a length direction of the moving ball screw, and thus the first support plate 1 and the second support plate 2 slide along the direction away from or close to each other.

The transmission mechanism 4 is configured to drive the third support plate 3 located between the first support plate 1 and second support plate 2 to synchronously move up and down when the first support plate 1 and the second support plate 2 move away from each other or move towards each other. The transmission mechanism 4 may be a rocker arm gear structure, a transmission arm gear group structure, or any other structures that can drive the third support plate 3 to synchronously move up and down. This is not limited in the embodiments of this application.

Figure 2:
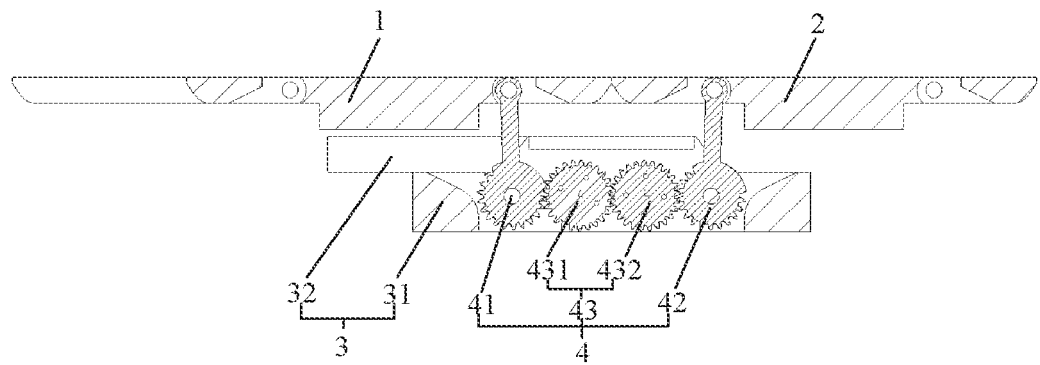
FIG. 2 is a schematic cross-sectional view of a support structure in a contracted state according to an embodiment of this application.

Specifically, in a case that the display does not require a larger support area, in other words, in a case that the support structure needs to reduce the support area, as shown in FIG. 2, the first support plate 1 and the second support plate 2 can be caused to move towards each other to drive the transmission mechanism 4 to run, so that the first support plate 1 and the second support plate 2 drive the third support plate 3 through the transmission mechanism 4 to move in the direction away from the display under the driving of the transmission mechanism 4. In this way, the support area of the support structure formed is equal to the sum of the support area of the first support plate 1 and the support area of the second support plate 2. It should be noted that after the first support plate 1 and the second support plate 2 move towards each other, end portions of the first support plate 1 and the second support plate 2 can either be in contact with each other or be separated by a certain distance. This is not limited in the embodiments of this application.

Figure 4:
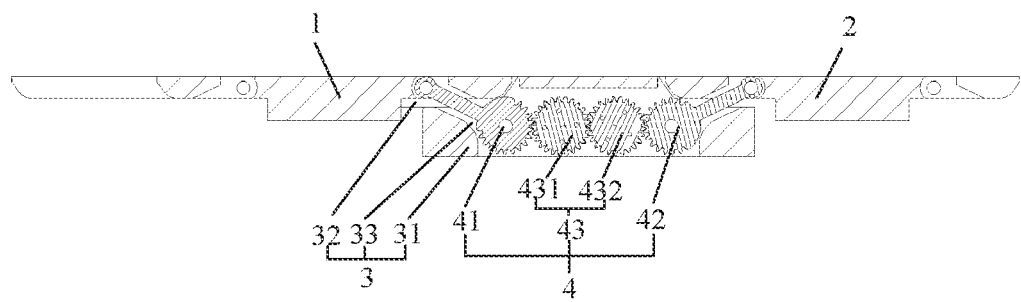
FIG. 4 is a schematic cross-sectional view of a support structure in an expanded state according to an embodiment of this application.

In a case that a larger support area is required for the display, in other words, in a case that the support structure needs to increase the support area, as shown in FIG. 4, the first support plate 1 and the second support plate 2 can be caused to move away from each other to drive the third support plate 3 through the transmission mechanism 4 to move in the direction close to the display, so that the support surface of the third support plate 3 and the support surface of the first support plate 1 are in the same plane. In this way, the support area of the support structure formed is equal to the sum of the support area of the first support plate 1, the support area of the second support plate 2, and the support area of the third support plate 3. It can be learned that when the first support plate 1 and the second support plate 2 move away from each other, the support area of the support structure can be increased.

It can be seen from the foregoing embodiments that in the embodiments of this application, the first support plate 1 and the second support plate 2 are arranged in parallel, the transmission mechanism 4 is disposed on one side of the first support plate 1 and the second support plate 2 away from the display, the third support plate 3 is connected to the transmission mechanism 4, and the transmission mechanism 4 is rotatably connected to the first support plate 1 and the second support plate 2. In this way, when it is necessary to increase the support area for the display, the first support plate 1 and the second support plate 2 can move away from each other, and the first support plate 1 and the second support plate 2 drive the third support plate 3 through the transmission mechanism 4 to move in a direction close to the display, so that the support surface of the third support plate 3 and the support surface of the first support plate 1 are in the same plane. As a result, the support area of the support structure formed is equal to the sum of the support area of the first support plate 1, the support area of the second support plate 2, and the support area of the third support plate 3. In this way, the third support plate 3 can provide a larger support area to adapt to the size variation of the display and thus meet the support requirements of displays of different active screen sizes.

Figure 3:
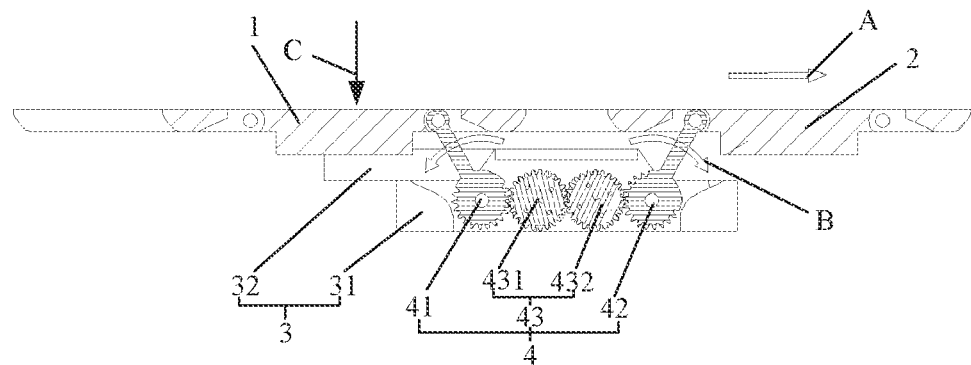
FIG. 3 is a schematic diagram of a movement direction of a support structure during expanding according to an embodiment of this application.

Optionally, as shown in FIG. 2 to FIG. 4, the transmission mechanism 4 includes a first rocker arm 41, a second rocker arm 42, and a driving gear 43. A first end of the first rocker arm 41 is hinged to a side wall of the first support plate 1, and a first end of the second rocker arm 42 is hinged to a side wall of the second support plate 2. A second end of the first rocker arm 41 and a second end of the second rocker arm 42 are separately hinged to the third support plate 3, and the second end of the first rocker arm 41 and the second end of the second rocker arm 42 are connected by the driving gear 43. A length of the first rocker arm 41 is equal to a length of the second rocker arm 42, and the length of the first rocker arm 41 is greater than a length of the third support plate 3 in a first direction, where the first direction is a direction perpendicular to the support surface of the third support plate 3.

Specifically, the first rocker arm 41 and the second rocker arm 42 are main transmission elements that realize the synchronous movement of the first support plate 1, the second support plate 2, and the third support plate 3. The first end of the first rocker arm 41 can be connected to side walls of two first support plates 1 by a first fixed pin, so that the first end of the first rocker arm 41 rotates around the first fixed pin. The first end of the second rocker arm 42 can be connected to the side wall of the second support plate 2 by a second fixed pin, so that the first end of the second rocker arm 42 rotates around the second fixed pin. The second end of the first rocker arm 41 and the second end of the second rocker arm 42 are connected to the third support plate 3 by a third fixed pin and a fourth fixed pin, respectively, so that the second end of the first rocker arm 41 rotates around the third fixed pin and the second end of the second rocker arm 42 rotates around the fourth fixed pin. The driving gear 43 is installed between the second end of the first rocker arm 41 and the second end of the second rocker arm 42, and the driving gear 43 is configured to drive the first rocker arm 41 and the second rocker arm 42 to synchronously rotate. The driving gear 43 may be a synchronous gear group.

It should be noted that due to the first end of the first rocker arm 41 being hinged to the side wall of the first support plate 1, the first end of the second rocker arm 42 being hinged to the side wall of the second support plate 2, and the second end of the first rocker arm 41 and the second end of the second rocker arm 42 being separately hinged to the third support plate 3, as shown in FIG. 4, when the first support plate 1 and the second support plate 2 move away from each other, the first end of the first rocker arm 41 and the first end of the second rocker arm 42 rotate along a first rotation direction with the movement of the first support plate 1 and the second support plate 2. Consequently, the second end of the first rocker arm 41 and the second end of the second rocker arm 42 also rotate along the first rotation direction. As the lengths of the first rocker arm and the second rocker arm do not change during the rotation, and both the length of the first rocker arm 41 and the length of the second rocker arm 42 are greater than the length of the third support plate 3 in the first direction, the third support plate 3 is gradually moved closer to the display under the driving of the second end of the first rocker arm 41 and the second end of the second rocker arm 42 until the support surface of the third support plate 3 and the support surface of the first support plate 1 are in the same plane, thereby expanding the support area of the support structure. In this case, the side wall and the support surface are two mutually perpendicular surfaces, a direction of movement of the first support plate 1 and the second support plate 2 is consistent with the direction indicated as A in FIG. 3, a direction of rotation of the first rocker arm 41 and the second rocker arm 42 is consistent with the direction indicated as B in FIG. 3, and the first direction is consistent with the direction indicated as C in FIG. 3.

Conversely, as shown in FIG. 2, when the first support plate 1 and the second support plate 2 move towards each other, the first end of the first rocker arm 41 and the first end of the second rocker arm 42 rotate along a second rotation direction with the movement of the first support plate 1 and the second support plate 2. Consequently, the second end of the first rocker arm 41 and the second end of the second rocker arm 42 also rotate along the second rotation direction. As the lengths of the first rocker arm and the second rocker arm do not change during the rotation, and both the length of the first rocker arm 41 and the length of the second rocker arm 42 are greater than the length of the third support plate 3 in the first direction, the third support plate 3 is gradually moved away from the display under the driving of the second end of the first rocker arm 41 and the second end of the second rocker arm 42 until it reaches the bottom of the first support plates 1 and the second support plate 2, thereby contracting the support area of the support structure. In this case, the first rotation direction and the second rotation direction are two opposite rotation directions.

Optionally, the driving gear 43 includes a first gear 431 and a second gear 432. The second end of the first rocker arm 41 and the second end of the second rocker arm 42 both have curved tooth surfaces. The second end of the first rocker arm 41 engages with the first gear 431, and the first gear 431 engages with the second gear 432. The second end of the second rocker arm 42 engages with the second gear 432.

Specifically, due to the engagement between the second end of the first rocker arm 41 and the first gear 431, the engagement between the first gear 431 and the second gear 432, and the engagement between the second end of the second rocker arm 42 and the second gear 432, when the second end of the first rocker arm 41 rotates, the rotation of the second end of the first rocker arm 41 drives the first gear 431 to rotate, the rotation of the first gear 431 drives the second gear 432 to rotate, and the rotation of the second gear 432 drives the second rocker arm 42 to rotate. With a transmission ratio of the first gear 431 to the second gear 432 being 1, the first rocker arm 41 and the second rocker arm 42 can rotate synchronously, thereby ensuring that when the first support plate 1 and the second support plate 2 move away from each other, the support surface of the third support plate 3 and the support surface of the first support plate 1 are in the same plane.

Figure 9:
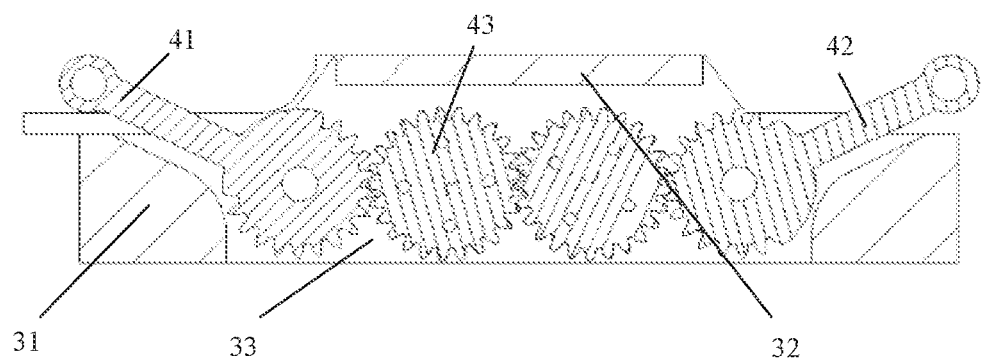
FIG. 9 is a schematic structural diagram of cooperation between a third support plate and a transmission mechanism according to an embodiment of this application.

Optionally, as shown in FIG. 3 and FIG. 9, a limiting slot 33 is provided on a side wall of the third support plate 3. The second end of the first rocker arm 41, the second end of the second rocker arm 42, and the driving gear 43 are all installed in the limiting slot 33. The limiting slot 33 close to the first rocker arm 41 and the limiting slot 33 close to the second rocker arm 42 have arc-shaped groove slot walls, and the arc-shaped slot walls bend away from the first rocker arm 41, where the side wall of the third support plate 3 is a surface perpendicular to the support surface of the third support plate 3.

It should be noted that the limiting slot 33 is opened along the direction perpendicular to the side wall of the third support plate 3, creating recess on the side wall of the third support plate 3. This provides sufficient installation space for the first rocker arm 41, the second rocker arm 42, and the driving gear 43 through the limiting slot 33, making the overall structure more compact. In addition, the preceding transmission method ensures that the second end of the first rocker arm 41, the second end of the second rocker arm 42, the first gear 431, and the second gear 432 are in the same plane, making the overall structure of the transmission mechanism 4 more compact. This in turn reduces the overall size of the support structure, facilitating the installation of the support structure and other devices.

Furthermore, the limiting slot 33 close to the first rocker arm 41 and the limiting slot 33 close to the second rocker arm 42 have arc-shaped slot walls, and the arc-shaped slot walls bend in the direction away from the first rocker arm 41. In consequence, the contour of the arc-shaped slot wall can match the rotation trajectory of the first rocker arm 41 and the rotation trajectory of the second rocker arm 42. Therefore, the arc-shaped slot walls can provide certain limitations for the second end of the first rocker arm 41 and the second end of the second rocker arm 42 during rotation, preventing the first rocker arm 41 and the second rocker arm 42 from deviating during rotation, thereby maintaining stability during the transmission action of the entire transmission mechanism 4.

Optionally, multiple limiting protrusions are provided on an end of the first support plate 1 close to the second support plate 2, two ends of the third support plate 3, and an end of the second support plate 2 close to the first support plate 1. When the first support plate 1 and the second support plate 2 move towards each other, the limiting protrusions provided on the end of the first support plate 1 are caught between two of the limiting protrusions provided on the end of the second support plate 2. When the first support plate 1 and the second support plate 2 move away from each other, the limiting protrusions provided on the end of the first support plate 1 are caught between two of the limiting protrusions provided on an end of the third support plate 3, and the limiting protrusions provided on the end of the second support plate 2 are caught between two of the limiting protrusions provided on the other end of the third support plate 3.

It should be noted that when the first support plate 1 and the second support plate 2 move towards each other and after the end of the first support plate 1 and the end of the second support plate 2 are in contact with each other, the limiting protrusions provided on the end of the first support plate 1 are caught between two of the limiting protrusions provided on the end of the second support plate 2. In this way, when the first support plate 1 and the second support plate 2 move towards each other, both the length direction of the first support plate 1 and the length direction of the second support plate 2 are supported by the third support plate 3, which contributes to providing stable support for the display.

Similarly, when the first support plate 1 and the second support plate 2 move away from each other and after the support surface of the third support plate 3 and the support surface of the first support plate 1 are in the same plane, the limiting protrusions provided on the end of the first support plate 1 are caught between two of the limiting protrusions provided on one end of the third support plate 3, and the limiting protrusions provided on the end of the second support plate 2 are caught between two of the limiting protrusions provided on the other end of the third support plate 3. In this way, when the first support plate 1 and the second support plate 2 move away from each other, both the length direction of the first support plate 1 and the length direction of the second support plate 2 are supported by the third support plate 3, which contributes to providing stable support for the display.

Optionally, spacings between any two adjacent limiting protrusions are equal.

It should be noted that because the spacings between any two adjacent limiting protrusions are equal, the distribution of the caught points provided by the limiting protrusions is more uniform when the first support plate 1 and the second support plate 2 move away from each other or move towards each other. This results in a more uniform distribution of the support force on the display surface, which further contributes to providing stable support for the display.

Figure 10:
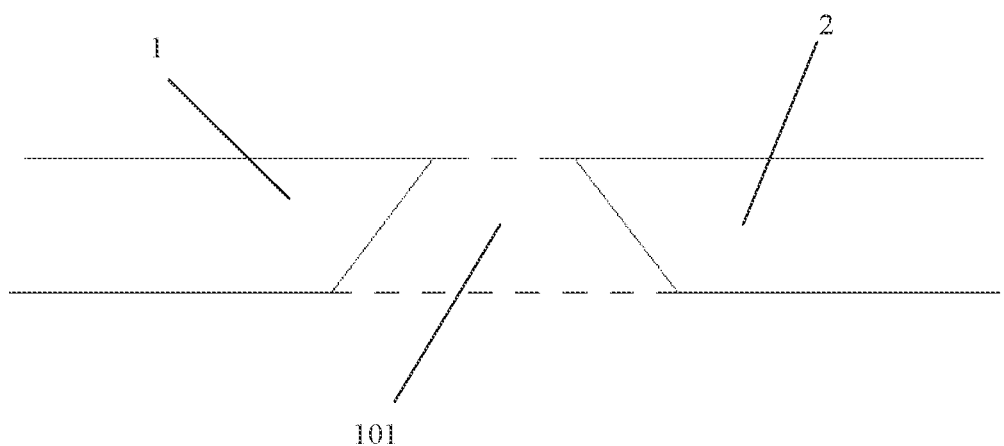
FIG. 10 is a schematic diagram of a partial structure of a first support plate and a second support plate according to an embodiment of this application.

Optionally, as shown in FIG. 10, when the first support plate 1 and the second support plate 2 slide along directions away from each other, an installation groove 101 is formed between an end of the first support plate 1 close to the third support plate 3 and an end of the second support plate 2 close to the third support plate 3. The third support plate 3 is located in the installation groove 101, and a size of the opening of the installation groove 101 is smaller than a size of the groove bottom. The opening of the installation groove 101 and the support surface of the first support plate 1 are in the same plane.

It should be noted that when the first support plate 1 and the second support plate 2 slide along the directions away from each other, because the installation groove 101 is formed between the end of the first support plate 1 close to the third support plate 3 and the end of the second support plate 2 close to the third support plate 3, the third support plate 3 is located in the installation groove 101, and the size of the opening of the installation groove 101 is smaller than the size of the groove bottom, the area of the support surface of the third support plate 3 is smaller than an area of a non-support surface of the third support plate 3. This results in the overall shape of the third support plate 3 being wedge-shaped. When the third support plate 3 is being lifted, it first reaches the bottom of the installation groove 101. Due to the smaller size of the opening of the installation groove 101 compared to the size of the groove bottom, it helps prevent the contact between the third support plate 3 and the groove wall of the installation groove 101 during the lifting. As the third support plate 3 gradually lifts, the spacing from the third support plate 3 to the first support plate 1 and the second support plate 2 gradually decreases, so that the end of the first support plate 1 close to the third support plate 3 and the end of the second support plate 2 close to the third support plate 3 are embedded within the installation groove 101, which contributes to maintain the stability of the position of the third support plate 3 and the overall stability of the support structure.

Optionally, when the first support plate 1 and the second support plate 2 move towards each other, the limiting protrusion provided on the end of the first support plate 1 is in clearance fit to two of the limiting protrusions provided on the end of the second support plate 2.

It should be noted that when the first support plate 1 and the second support plate 2 move towards each other, the limiting protrusion provided on the end of the first support plate 1 is in clearance fit to two of the limiting protrusions provided on the end of the second support plate 2. Therefore, when the first support plate 1 and the second support plate 2 move towards each other, the limiting protrusion provided on the end of the first support plate 1 does not come into contact with two of the limiting protrusions provided on the end of the second support plate 2. This prevents friction between the limiting protrusions and the groove wall, avoiding damage to the structure of the first support plate 1 or the second support plate 2.

Optionally, as shown in FIG. 2 to FIG. 4, the third support plate 3 includes a support portion 31 and a limiting portion 32. The limiting portion 32 is located on one side of the support portion 31 and protrudes from the support portion 31 to form a limiting boss. When the first support plate 1 and the second support plate 2 move away from each other, a first support plate 1 overlaps on the limiting boss.

It should be noted that the limiting portion 32 protrudes from the support portion 31 to form the limiting boss so that the first support plate 1 and the second support plate 2 can be provided with a larger area of support through a limiting surface of the limiting boss, which more contributes to maintaining relative stability between the first support plate 1, the second support plate 2, and the third support plate 3.

It can be seen from the foregoing embodiments that the first support plate 1 and the second support plate 2 are arranged in parallel, the transmission mechanism 4 is disposed on one side of the first support plate 1 and the second support plate 2 away from the display, the third support plate 3 is connected to the transmission mechanism 4, and the transmission mechanism 4 is rotatably connected to the first support plate 1 and the second support plate 2. In this way, when it is necessary to increase the support area for the display, the first support plate 1 and the second support plate 2 can move away from each other, and the first support plate 1 and the second support plate 2 drive the third support plate 3 through the transmission mechanism 4 to move in a direction close to the display, so that the support surface of the third support plate 3 and the support surface of the first support plate 1 are in the same plane. As a result, the support area of the support structure formed is equal to the sum of the support area of the first support plate 1, the support area of the second support plate 2, and the support area of the third support plate 3. In this way, the third support plate 3 can provide a larger support area to adapt to the size variation of the display and thus meet the support requirements of displays of different active screen sizes.

Figure 7:
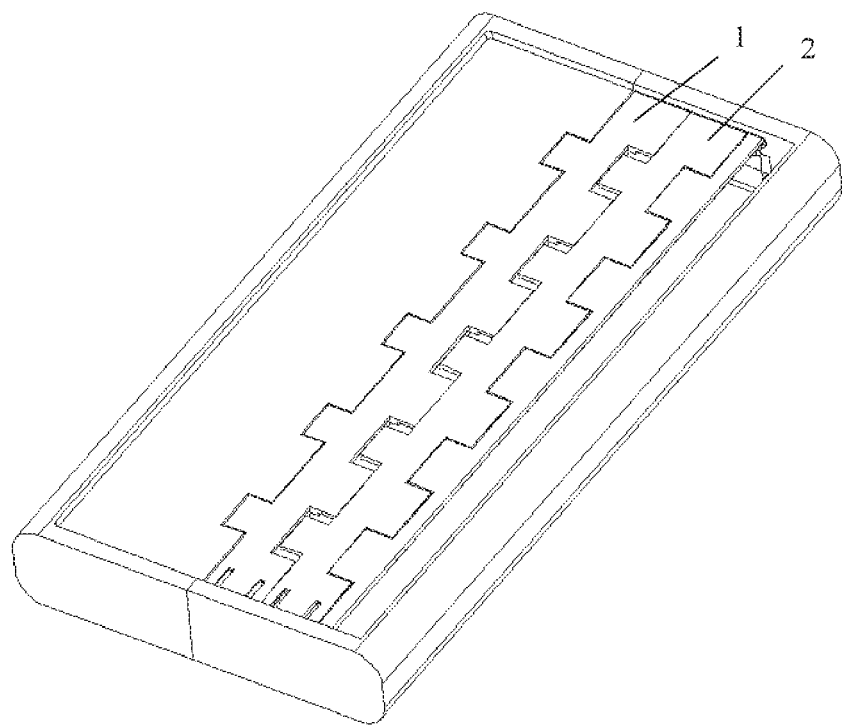
FIG. 7 is a schematic structural diagram of an electronic device with a display in a contracted state according to an embodiment of this application.
Figure 8:
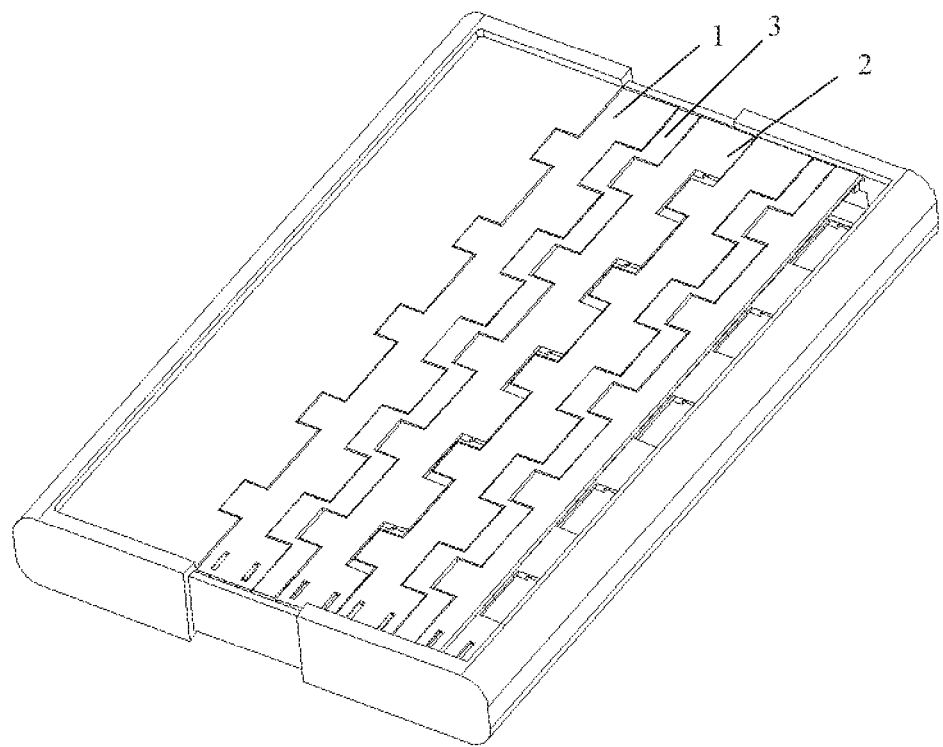
FIG. 8 is a schematic structural diagram of an electronic device with a display in an expanded state according to an embodiment of this application.

An embodiment of this application further provides an electronic device, as shown in FIG. 7 and FIG. 8. The electronic device includes a winding assembly, a housing, a display, and the support structure described in the embodiments of this application. The winding assembly is disposed in an inner cavity of the housing, and the display is wound on the winding assembly. When the first support plate 1 and the second support plate 2 slide towards each other, the winding assembly rotates along a first rotation direction, causing one end of the display to retract into the inner cavity of the housing, where the display covers the support surface of the first support plate 1 and the support surface of the second support plate 2.

When the first support plate 1 and the second support plate 2 slide away from each other, the winding assembly rotates along a second rotation direction, causing one end of the display to extend out of the inner cavity of the housing, where the display covers the support surface of the first support plate 1, the support surface of the second support plate 2, and the support surface of the third support plate 3. The first rotation direction and the second rotation direction are two opposite rotation directions.

The communications device in this embodiment of this application may be an apparatus, or may be a component, an integrated circuit, or a chip in a terminal. The apparatus may be a mobile electronic device or a non-mobile electronic device. For example, the mobile electronic device may be a mobile phone, a tablet computer, a notebook computer, a palmtop computer, a vehicle-mounted terminal, a wearable device, an ultra-mobile personal computer (UMPC), a netbook, or a personal digital assistant (PDA), and the non-mobile electronic device may be a personal computer (PC), a television (TV), a teller machine, a self-service machine, or the like. This is not specifically limited in the embodiments of this application.

The communications device in this embodiment of this application may be an apparatus with an operating system. The operating system may be an Android operating system, iOS operating system, or other possible operating system. This is not specifically limited in the embodiments of this application.

It should be noted that cooperation of the winding assembly and the support structure can achieve the expansion and contraction of the display 2, thereby meeting the requirements of the electronic device for different active screen sizes.

Figure 5:
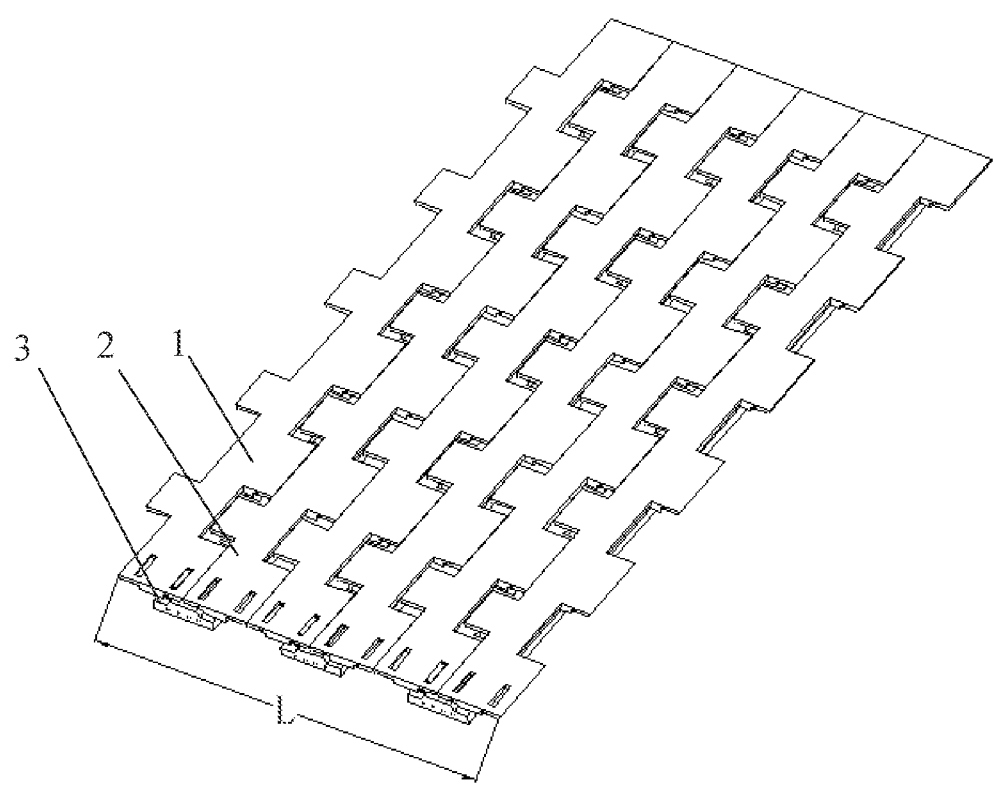
FIG. 5 is a schematic structural diagram of multiple support structures for a display in a contracted state in a case of an electronic device including the multiple support structures, according to an embodiment of this application.
Figure 6:
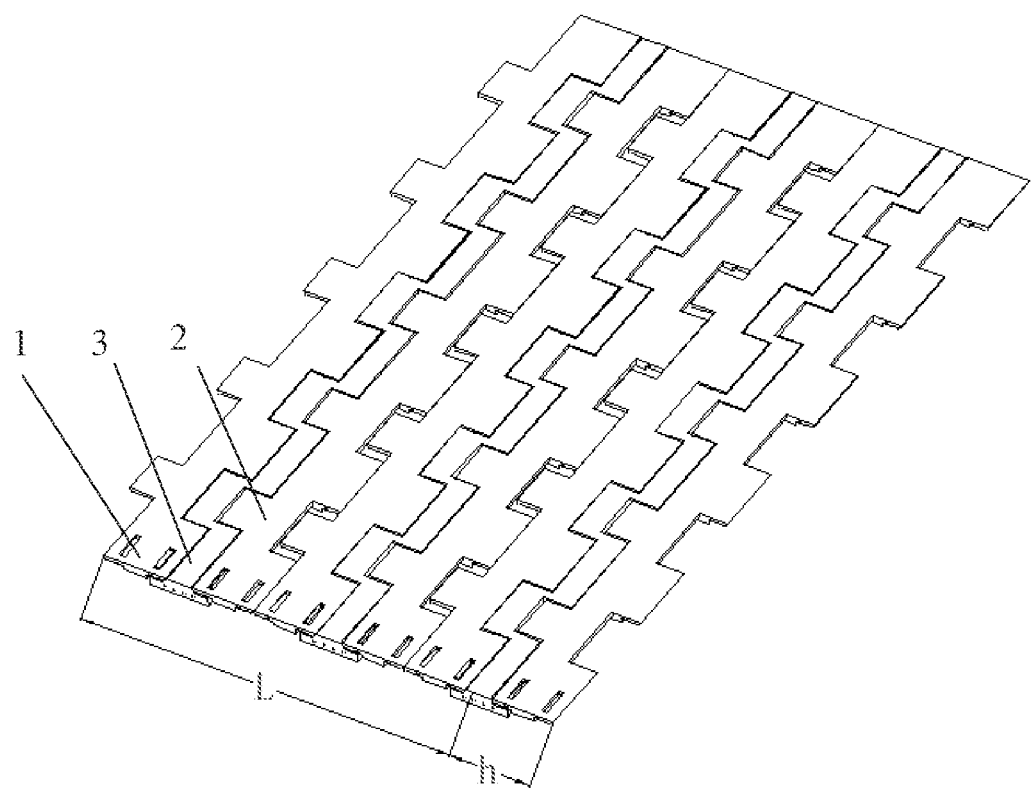
FIG. 6 is a schematic structural diagram of multiple support structures for a display in an expanded state in a case of an electronic device including the multiple support structures, according to an embodiment of this application.

Optionally, as shown in FIG. 5 or FIG. 6, the electronic device includes one or more such support structures.

In this embodiment of this application, the electronic device may include one support structure or may include more support structures, and the specific number of support structures depends on the size of the support surface required by the display. This is not limited in the embodiments of this application. For example, as shown in FIG. 5 and FIG. 6, if a width of the support structure in a contracted state is L and the width of the support surface required by the display needs to be increased by h, and h is exactly equal to a width of one third support plate 3, the electronic device can include one support structure. If h is exactly equal to a width of two third support plates 3, the electronic device can include two support structures.

It should be noted that in a case that the support structure includes at least two support structures, when it is necessary to increase the support area for the display, the third support plate 3 in each support structure may be disposed between the first support plate 1 and the second support plate 2, or the third support plate 3 in one support structure of multiple support structures may be disposed between the first support plate 1 and the second support plate 2, or the third support plates 3 in several support structures of multiple support structures may be disposed between the first support plate 1 and the second support plate 2. The number of support structures that need to be expanded is determined depending on the support area required by the display, and this is not limited in the embodiments of this application.

In this embodiment of this application, the electronic device includes a winding assembly, a housing, a display, and the support structure described in the embodiments of this application, when it is necessary to increase the support area for the display, the first support plate 1 and the second support plate 2 can move away from each other, and the first support plate 1 and the second support plate 2 drive the third support plate 3 through the transmission mechanism 4 to move in a direction close to the display, so that the support surface of the third support plate 3 and the support surface of the first support plate 1 are in the same plane. As a result, the support area of the support structure formed is equal to the sum of the support area of the first support plate 1, the support area of the second support plate 2, and the support area of the third support plate 3. In this way, the third support plate 3 can provide a larger support area to adapt to the size variation of the display and thus meet the support requirements of displays of different active screen sizes. In this way, a larger supporting area can be provided by the third supporting plate 3 to adapt to the changing size of the display 2 itself, thereby reducing the limitation of expanding the active screen size and meeting the requirements of electronic devices for different active screen sizes.

Persons of ordinary skill in the art may realize that units and algorithm steps of various examples described with reference to the embodiments disclosed in this specification can be implemented by using electronic hardware or a combination of computer software and electronic hardware. Whether the functions are performed by hardware or software depends on particular applications and design constraints of the technical solutions. Persons skilled in the art may use different structures to implement the described functions for each particular application, but it should not be considered that the implementation goes beyond the scope of this disclosure.

It may be clearly understood by persons skilled in the art that, for the purpose of convenient and brief description, for a detailed working process of the foregoing system, apparatus, and unit, reference may be made to a corresponding process in the foregoing embodiments, and details are not described herein again.

In the embodiments provided in this application, it should be understood that the disclosed apparatus may be implemented in other manners. For example, the described apparatus embodiment is merely an example. For example, the unit division is merely logical function division and may be other division in actual implementation. For example, multiple units or components may be combined or integrated into another system, or some features may be ignored or may not be performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on multiple network elements. Some or all of the units may be selected based on actual requirements to achieve the objectives of the solutions of the embodiments.

In addition, functional units in the embodiments of this disclosure may be integrated into one processing unit, or each of the units may exist alone physically, or two or more units are integrated into one unit.

By means of the foregoing description of the implementations, persons skilled in the art may clearly understand that the foregoing embodiment may be implemented by software with a necessary general hardware platform. Certainly, the method in the foregoing embodiment may also be implemented by hardware. However, in many cases, the former is a preferred implementation. Based on such an understanding, the technical solutions of this application essentially or the part contributing to the prior art may be implemented in a form of a software product. The software product is stored in a storage medium (such as a read-only memory (ROM), an associative memory, a magnetic disk, or an optical disc), and includes several instructions for instructing a terminal (which may be a mobile phone, a computer, a server, an air conditioner, a network, or the like) to perform the support structure and the electronic device described in the embodiments of this application.

It can be understood that the embodiments described in the embodiments of this disclosure may be implemented by hardware, software, firmware, middleware, microcode, or a combination thereof. For hardware implementation, a module, a unit, or a subunit may be implemented in one or more application specific integrated circuits (ASIC), digital signal processors (DSP), digital signal processing devices (DSP Device, DSPD), programmable logic devices (PLD), field-programmable gate arrays (FPGA), general-purpose processors, controllers, microcontrollers, microprocessors, and other electronic units for performing the functions described in this disclosure, or a combination thereof.

For software implementation, the technologies described in the embodiments of the present disclosure may be implemented by modules (such as processes and functions) that perform the functions described in the embodiments of the present disclosure. Software code may be stored in the memory and executed by the processor. The memory may be implemented in or outside the processor.

What is claimed is:

1. A support structure, used for supporting a display, wherein the support structure comprises a first support plate, a second support plate, a third support plate, and a transmission mechanism; wherein
    the first support plate and the second support plate are arranged in parallel; the transmission mechanism is disposed on one side of the first support plate and the second support plate away from the display, the third support plate is connected to the transmission mechanism, and the transmission mechanism is rotatably connected to the first support plate and the second support plate;
    when the first support plate and the second support plate move towards each other, the first support plate and the second support plate drive the third support plate through the transmission mechanism to move in a direction away from the display; and
    when the first support plate and the second support plate move away from each other, the first support plate and the second support plate drive the third support plate through the transmission mechanism to move in a direction close to the display, so that a support surface of the third support plate and a support surface of the first support plate are in the same plane;
    wherein the transmission mechanism comprises a first rocker arm, a second rocker arm, and a driving gear; wherein
    a first end of the first rocker arm is hinged to a side wall of the first support plate, a first end of the second rocker arm is hinged to a side wall of the second support plate, a second end of the first rocker arm and a second end of the second rocker arm are separately hinged to the third support plate, and the second end of the first rocker arm and the second end of the second rocker arm are connected by the driving gear; and
    a length of the first rocker arm is equal to a length of the second rocker arm, and the length of the first rocker arm is greater than a length of the third support plate in a first direction, wherein the first direction is perpendicular to the support surface of the third support plate.

2. The support structure according to claim 1, wherein the driving gear comprises a first gear and a second gear; wherein both the second end of the first rocker arm and the second end of the second rocker arm have an arc-shaped tooth surface, the second end of the first rocker arm engages with the first gear, the first gear engages with the second gear, and the second end of the second rocker arm engages with the second gear.

3. The support structure according to claim 1, wherein a limiting slot is provided on a side wall of the third support plate; and
the second end of the first rocker arm, the second end of the second rocker arm, and the driving gear are all installed in the limiting slot, both a slot wall of the limiting slot close to the first rocker arm and a slot wall of the limiting slot close to the second rocker arm have an arc-shaped slot wall, and curved surfaces of the arc-shaped slot walls bend away from the first rocker arm, wherein the side wall of the third support plate is a surface perpendicular to the support surface of the third support plate.

4. The support structure according to claim 1, wherein multiple limiting protrusions are provided on an end of the first support plate close to the second support plate, two ends of the third support plate, and an end of the second support plate close to the first support plate;
when the first support plate and the second support plate move towards each other, the limiting protrusions provided on the end of the first support plate are caught between two of the limiting protrusions provided on the end of the second support plate; and
when the first support plate and the second support plate move away from each other, the limiting protrusions provided on the end of the first support plate are caught between two of the limiting protrusions provided on one end of the third support plate, and the limiting protrusions provided on the end of the second support plate are caught between two of the limiting protrusions provided on the other end of the third support plate.

5. The support structure according to claim 4, wherein when the first support plate and the second support plate move away from each other, an installation groove is formed between an end of the first support plate close to the third support plate and an end of the second support plate close to the third support plate, the third support plate is located in the installation groove, and a size of an opening of the installation groove is smaller than a size of the groove bottom, wherein the opening of the installation groove and the support surface of the first support plate are in the same plane.

6. The support structure according to claim 4, wherein when the first support plate and the second support plate move towards each other, the limiting protrusion provided on the end of the first support plate is in clearance fit with two of the limiting protrusions provided on the end of the second support plate.

7. The support structure according to claim 1, wherein the third support plate comprises a support portion and a limiting portion; wherein
the limiting portion is located on one side of the support portion and protrudes from the support portion to form a limiting boss; and when the first support plate and the second support plate move away from each other, an end of the first support plate overlaps with the limiting boss.

8. An electronic device, wherein the electronic device comprises a winding assembly, a housing, a display, and a support structure; wherein the support structure comprises a first support plate, a second support plate, a third support plate, and a transmission mechanism; wherein
the first support plate and the second support plate are arranged in parallel; the transmission mechanism is disposed on one side of the first support plate and the second support plate away from the display, the third support plate is connected to the transmission mechanism, and the transmission mechanism is rotatably connected to the first support plate and the second support plate;
when the first support plate and the second support plate move towards each other, the first support plate and the second support plate drive the third support plate through the transmission mechanism to move in a direction away from the display; and
when the first support plate and the second support plate move away from each other, the first support plate and the second support plate drive the third support plate through the transmission mechanism to move in a direction close to the display, so that a support surface of the third support plate and a support surface of the first support plate are in the same plane;
the winding assembly is disposed in an inner cavity of the housing, and the display is wound on the winding assembly; and when the first support plate and the second support plate move towards each other, the winding assembly rotates along a first rotation direction, causing one end of the display to retract into the inner cavity of the housing, wherein the display covers the support surface of the first support plate and the support surface of the second support plate; and
when the first support plate and the second support plate move away from each other, the winding assembly rotates along a second rotation direction, causing one end of the display to extend out of the inner cavity of the housing, wherein the display covers the support surface of the first support plate, the support surface of the second support plate, and the support surface of the third support plate, and the first rotation direction and the second rotation direction are two opposite rotation directions;
wherein the transmission mechanism comprises a first rocker arm, a second rocker arm, and a driving gear; wherein
a first end of the first rocker arm is hinged to a side wall of the first support plate, a first end of the second rocker arm is hinged to a side wall of the second support plate, a second end of the first rocker arm and a second end of the second rocker arm are separately hinged to the third support plate, and the second end of the first rocker arm and the second end of the second rocker arm are connected by the driving gear; and
a length of the first rocker arm is equal to a length of the second rocker arm, and the length of the first rocker arm is greater than a length of the third support plate in a first direction, wherein the first direction is perpendicular to the support surface of the third support plate.

9. The electronic device according to claim 8, wherein the electronic device comprises one or more such support structures.

10. The electronic device according to claim 8, wherein the driving gear comprises a first gear and a second gear; wherein
both the second end of the first rocker arm and the second end of the second rocker arm have an arc-shaped tooth surface, the second end of the first rocker arm engages with the first gear, the first gear engages with the second gear, and the second end of the second rocker arm engages with the second gear.

11. The electronic device according to claim 8, wherein a limiting slot is provided on a side wall of the third support plate; and the second end of the first rocker arm, the second end of the second rocker arm, and the driving gear are all installed in the limiting slot, both a slot wall of the limiting slot close to the first rocker arm and a slot wall of the limiting slot close to the second rocker arm have an arc-shaped slot wall, and curved surfaces of the arc-shaped slot walls bend away from the first rocker arm, wherein the side wall of the third support plate is a surface perpendicular to the support surface of the third support plate.

12. The electronic device according to claim 8, wherein multiple limiting protrusions are provided on an end of the first support plate close to the second support plate, two ends of the third support plate, and an end of the second support plate close to the first support plate;

when the first support plate and the second support plate move towards each other, the limiting protrusions provided on the end of the first support plate are caught between two of the limiting protrusions provided on the end of the second support plate; and when the first support plate and the second support plate move away from each other, the limiting protrusions provided on the end of the first support plate are caught between two of the limiting protrusions provided on one end of the third support plate, and the limiting protrusions provided on the end of the second support plate are caught between two of the limiting protrusions provided on the other end of the third support plate.

13. The electronic device according to claim 12, wherein when the first support plate and the second support plate move away from each other, an installation groove is formed between an end of the first support plate close to the third support plate and an end of the second support plate close to the third support plate, the third support plate is located in the installation groove, and a size of an opening of the installation groove is smaller than a size of the groove bottom, wherein the opening of the installation groove and the support surface of the first support plate are in the same plane.

14. The electronic device according to claim 12, wherein when the first support plate and the second support plate move towards each other, the limiting protrusion provided on the end of the first support plate is in clearance fit with two of the limiting protrusions provided on the end of the second support plate.

15. The electronic device according to claim 8, wherein the third support plate comprises a support portion and a limiting portion; wherein the limiting portion is located on one side of the support portion and protrudes from the support portion to form a limiting boss; and when the first support plate and the second support plate move away from each other, an end of the first support plate overlaps with the limiting boss.

\* \* \* \* \*